(12) United States Patent
Barkan et al.

(10) Patent No.: US 7,360,707 B2
(45) Date of Patent: Apr. 22, 2008

(54) INTEGRATED ASSEMBLY OF TRIGGER AND LIGHTPIPE IN ELECTRO-OPTICAL READERS

(75) Inventors: Edward Barkan, Miller Place, NY (US); Mark E. Drzymala, Commack, NY (US); Joseph Giordano, Bayville, NY (US); Kangpin Tee, Brooklyn, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 158 days.

(21) Appl. No.: 11/237,417

(22) Filed: Sep. 28, 2005

(65) Prior Publication Data

US 2007/0069024 A1 Mar. 29, 2007

(51) Int. Cl.
*G06K 7/10* (2006.01)
(52) U.S. Cl. .................... 235/472.01; 235/472.02; 235/472.03; 235/462.48; 235/454; 235/492
(58) Field of Classification Search ........... 235/472.01, 235/472.03, 472.02, 492, 462.48, 462.49
See application file for complete search history.

(56) References Cited

U.S. PATENT DOCUMENTS

| | | | | |
|---|---|---|---|---|
| 5,471,042 A | * | 11/1995 | Kirkeby et al. | 235/472.02 |
| 6,081,629 A | * | 6/2000 | Browning | 382/313 |
| 6,328,211 B1 | * | 12/2001 | Wilz et al. | 235/462.01 |
| 6,978,930 B2 | * | 12/2005 | Harding et al. | 235/383 |
| 7,133,837 B1 | * | 11/2006 | Barnes, Jr. | 705/26 |
| 2002/0100804 A1 | * | 8/2002 | Byun et al. | 235/462.01 |
| 2004/0079804 A1 | * | 4/2004 | Harding et al. | 235/472.02 |
| 2005/0023358 A1 | * | 2/2005 | Byun et al. | 235/462.45 |
| 2005/0274810 A1 | * | 12/2005 | Schmidt et al. | 235/462.43 |

* cited by examiner

*Primary Examiner*—Steven S. Paik
(74) *Attorney, Agent, or Firm*—Kirschstein, et al.

(57) ABSTRACT

A trigger for initiating reading, and a lightpipe for displaying the results of the reading, together form an integrated molded assembly for installation into an electro-optical reader.

16 Claims, 4 Drawing Sheets

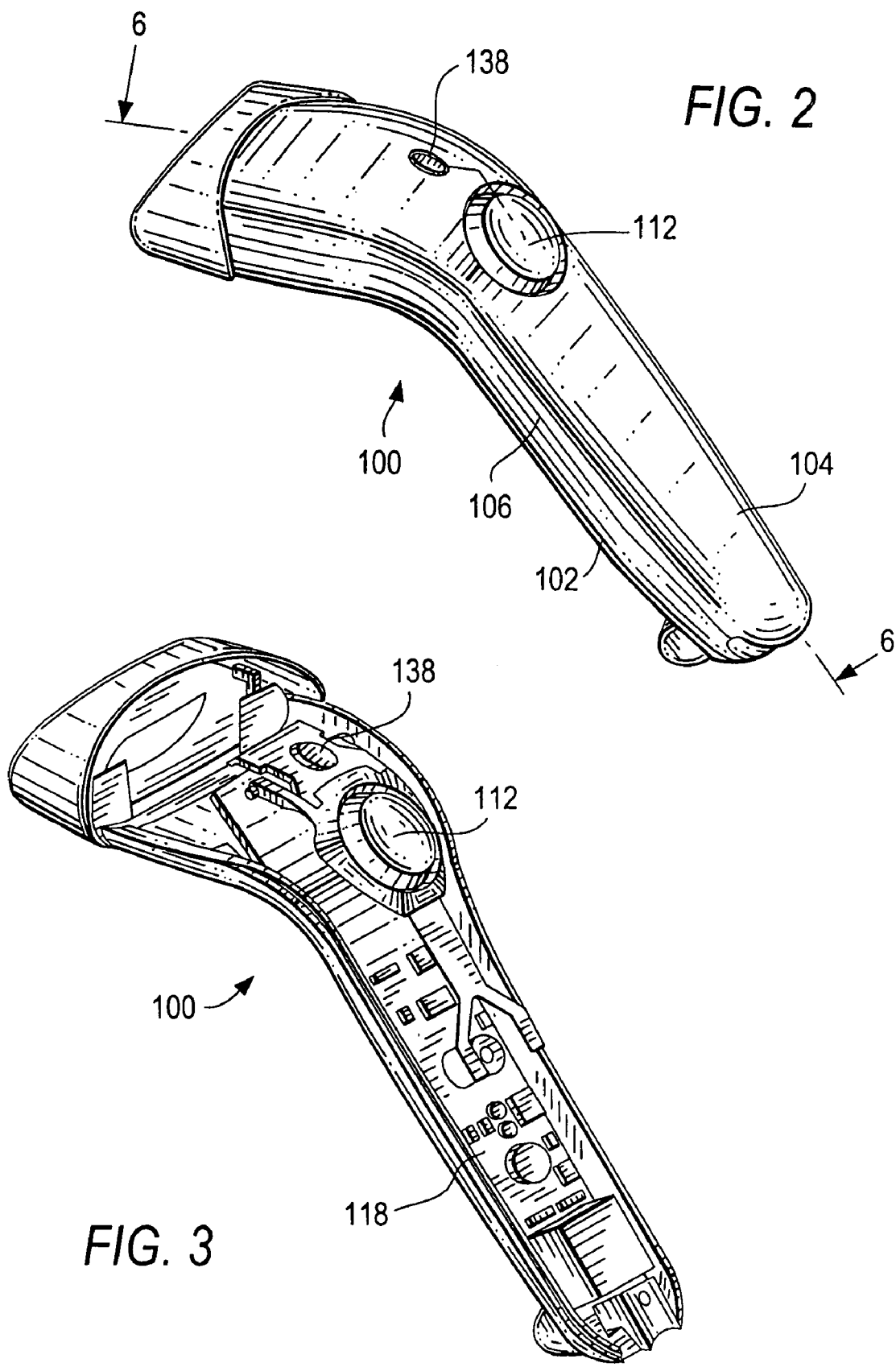

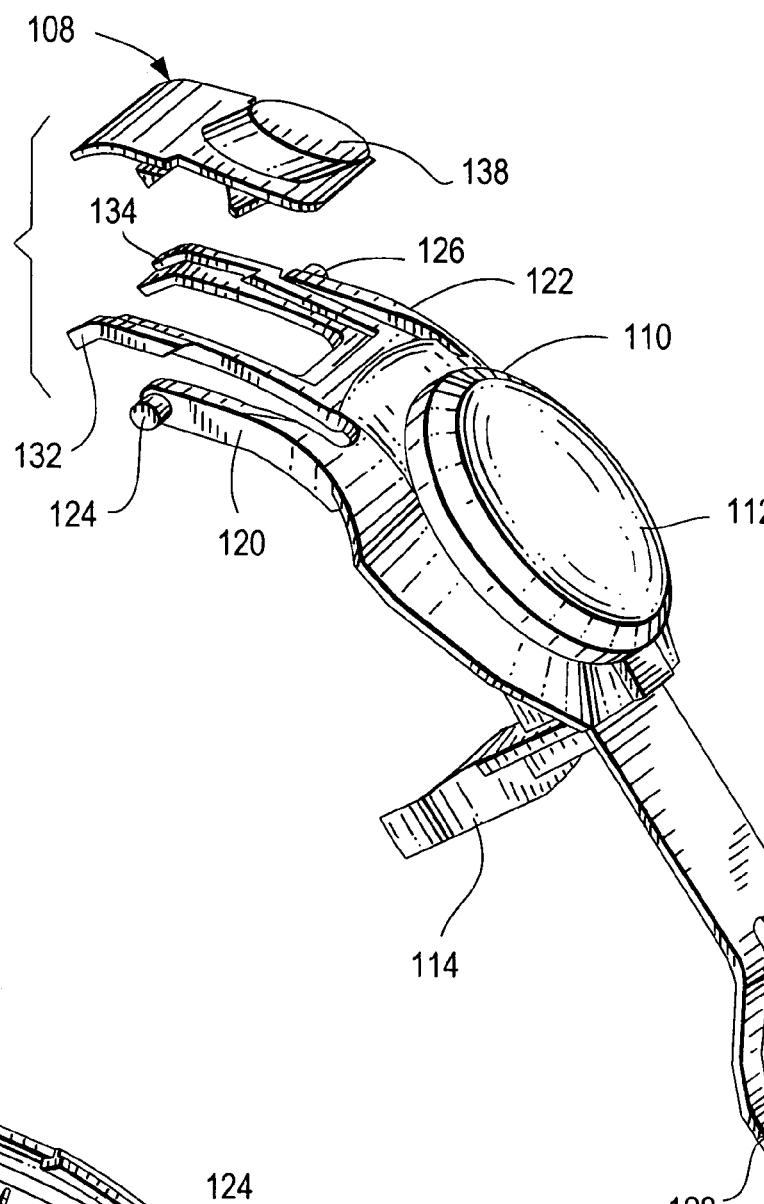
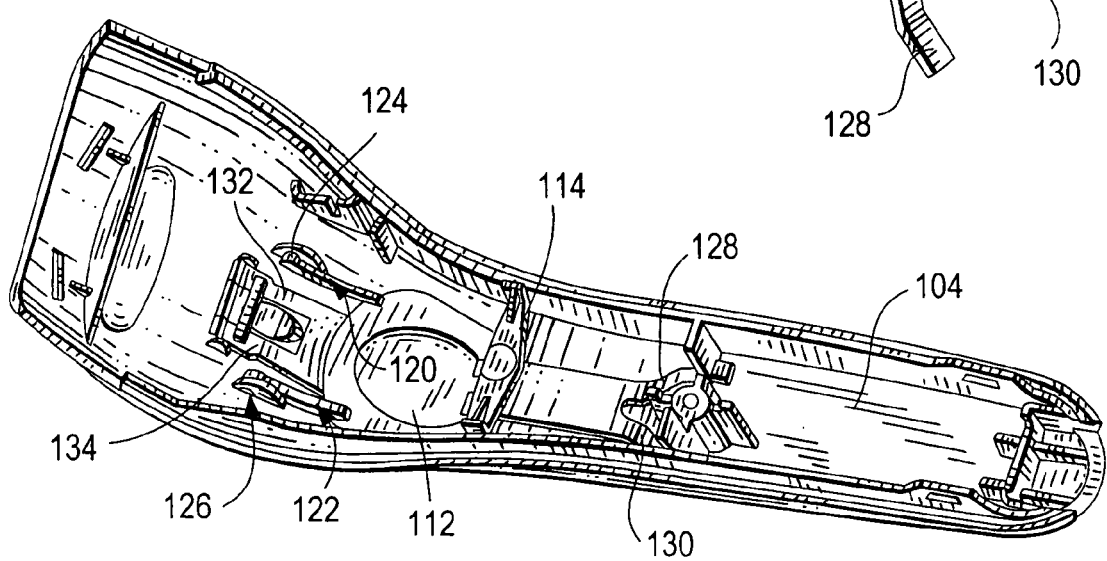

INTEGRATED ASSEMBLY OF TRIGGER AND LIGHTPIPE IN ELECTRO-OPTICAL READERS

BACKGROUND OF THE INVENTION

1. Field of the Invention

The present invention generally relates to electro-optical readers, such as laser scanners for reading indicia, such as bar code symbols and, more particularly, to an integrated assembly of a trigger and a lightpipe for installation in such readers.

2. Description of the Related Art

Various electro-optical systems or readers have been developed for reading indicia such as bar code symbols appearing on a label or on a surface of an article. The bar code symbol itself is a coded pattern of graphic indicia comprised of a series of bars of various widths spaced apart from one another to bound spaces of various widths, the bars and spaces having different light reflecting characteristics. The readers function by electro-optically transforming the pattern of the graphic indicia into a time-varying electrical signal, which is digitized and decoded into data relating to the symbol being read.

Typically, a laser beam from a laser is directed along a light path toward a target that includes the bar code symbol on a target surface. A moving-beam scanner operates by repetitively sweeping the laser beam in a scan line or a series of scan lines across the symbol by means of motion of a scanning component, such as the laser itself or a scan mirror disposed in the path of the laser beam. Optics focus the laser beam into a beam spot on the target surface, and the motion of the scanning component sweeps the beam spot across the symbol to trace a scan line across the symbol. Motion of the scanning component is typically effected by an electrical drive motor.

The readers also include a sensor or photodetector which detects light along the scan line that is reflected or scattered from the symbol. The photodetector or sensor is positioned such that it has a field of view which ensures the capture of the reflected or scattered light, and converts the latter into an electrical analog signal.

In retroreflective light collection, a single optical component, e.g., a reciprocally oscillatory mirror, such as described in U.S. Pat. No. 4,816,661 or U.S. Pat. No. 4,409,470, both herein incorporated by reference, sweeps the beam across the target surface and directs the collected light to the sensor. In non-retroreflective light collection, the reflected laser light is not collected by the same optical component used for scanning. Instead, the sensor is independent of the scanning beam and has a large field of view. The reflected laser light may trace across the sensor.

Electronic control circuitry and software decode the electrical analog signal from the sensor into a digital representation of the data represented by the symbol that has been scanned. For example, the analog electrical signal generated by the photodetector may be converted by a digitizer into a pulse width modulated digitized signal, with the widths corresponding to the physical widths of the bars and spaces. Alternatively, the analog electrical signal may be processed directly by a software decoder. See, for example, U.S. Pat. No. 5,504,318.

The decoding process usually works by applying the digitized signal to a microprocessor running a software algorithm, which attempts to decode the signal. If a symbol is decoded successfully and completely, the decoding terminates, and an indicator of a successful read (such as a green light and/or audible beep) is provided to a user. Otherwise, the microprocessor receives the next scan, and performs another decoding into a binary representation of the data encoded in the symbol, and to the alphanumeric characters so represented. Once a successful read is obtained, the binary data is communicated to a host computer for further processing, for example, information retrieval from a look-up table.

Reading of the indicia is initiated by manual depression of a trigger, such as the trigger 210 depicted in FIG. 1 herein. FIG. 1 depicts a prior art reader, especially the reader 10 illustrated in U.S. Pat. No. 6,321,990, the entire contents of which are incorporated herein by reference thereto. The trigger 210 is mounted on the reader 10 and is depressable by the operator to actuate a trigger switch 224 mounted on a printed circuit board 180 in the handle 12. When the trigger switch 224 is depressed, an electrical trigger signal is generated by the switch closure and is used to initiate reading of a symbol.

FIG. 1 also shows a pair of differently colored light emitting diodes 236, 238 mounted on a printed circuit board 104 within the reader. These diodes 236, 238 serve as status indicators of reader operation. When illuminated, the light from each diode is conducted through a lightpipe 240 to and through an exterior wall 18 of the reader to visually advise the operator of a certain system function. The lightpipe 240 enhances and optimizes the status lights. For example, a green light from diode 238 can indicate that a symbol has been successfully read. A red light from diode 240 can indicate that the reading has failed. The combination of red and green lights can indicate faults in the reader. The two diodes can even be incorporated in a single diode package.

The trigger 210 and the lightpipe 240 are typically made of different materials and consist of two different parts. The trigger is typically installed in the reader by snap action, bonding or staking. The lightpipe is typically installed in the reader by bonding, heat staking, or ultrasonic welding. Some readers may overmold the lightpipe directly onto a housing of the reader, for example, on the exterior wall 18 of FIG. 1. However, the process of overmolding with the housing requires costly tooling and is difficult to achieve since the interface or parting line between the lightpipe and the housing is clearly visible to a customer. Blemishes at the interface between the lightpipe and the housing are unaesthetic and cannot be tolerated. The separate assembly of the trigger and the lightpipe is labor intensive. The making and assembling of these separate parts are costly.

SUMMARY OF THE INVENTION

Objects of the Invention

Accordingly, it is a general object of this invention to reduce the cost of making and assembling the trigger and the lightpipe.

It is an additional object of the present invention to simplify the assembly of the trigger and the lightpipe in an electro-optical reader.

It is another object of the present invention to integrate the trigger and the lightpipe as a single component.

FEATURES OF THE INVENTION

In keeping with the above objects and others which will become apparent hereinafter, one feature of the present invention resides, briefly stated, in an integrated assembly in a reader for electro-optically reading indicia, especially a reader having an actuatable trigger for initiating the reading of the indicia when actuated, and a lightpipe for visibly displaying light indicative of a status of the reading initiated by actuation of the trigger.

In accordance with this invention, the trigger and the lightpipe are integrated as a single component for assembly in the reader. Preferably, the trigger and the lightpipe are constituted of synthetic plastic materials, which are injection molded together in a one-piece construction.

In the preferred embodiment, the trigger and the lightpipe are made of different materials. For example, for a trigger which is expected to be depressed a multitude of times over its working life, the fatigue life of the material is important, as well as its resilience to return to its initial, undepressed position. For the lightpipe, its optical characteristics, such as transparency or translucence, are important.

To satisfy these concerns, this invention proposes to co-mold or overmold the trigger and the lightpipe of different materials, each optimized to perform its particular function. This could be done on a two-shot injection molding machine. The first shot could be the trigger, and the second shot could be the lightpipe, or vice versa. This type of molding is much simpler than the prior art technique of molding the lightpipe on the housing of the reader.

The portion of the trigger to be engaged and depressed by the operator is referred to herein as the press portion. The portion of the lightpipe at which the light is visible to the operator is referred to herein as the exposed end portion. Both the press portion of the trigger and the exposed end portion of the lightpipe are located exteriorly of the reader for ready access thereto. Upon the integration of the lightpipe and the trigger as a single component, it is desirable for the reader to be configured such that the press portion and the end portion are in close proximity to each other.

The one-piece construction reduces not only the cost of making, but also the cost of assembling, the reader. Labor costs are correspondingly decreased, thereby enabling the reader to be made at a very low cost, without sacrificing any of the functionality of the reader.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 2 is a perspective view of a hand-held electro-optical reader in accordance with this invention;

FIG. 3 is a view analogous to FIG. 2, but with an upper part of the housing removed to expose the interior of the reader;

FIG. 4 is an enlarged, exploded view of a lightpipe and a trigger that form an integrated assembly in accordance with this invention;

FIG. 5 is a perspective view of the assembly of FIG. 4 mounted on the underside of an upper part of the housing, as seen from below.

DETAILED DESCRIPTION OF THE PREFERRED EMBODIMENTS

Figure 1:
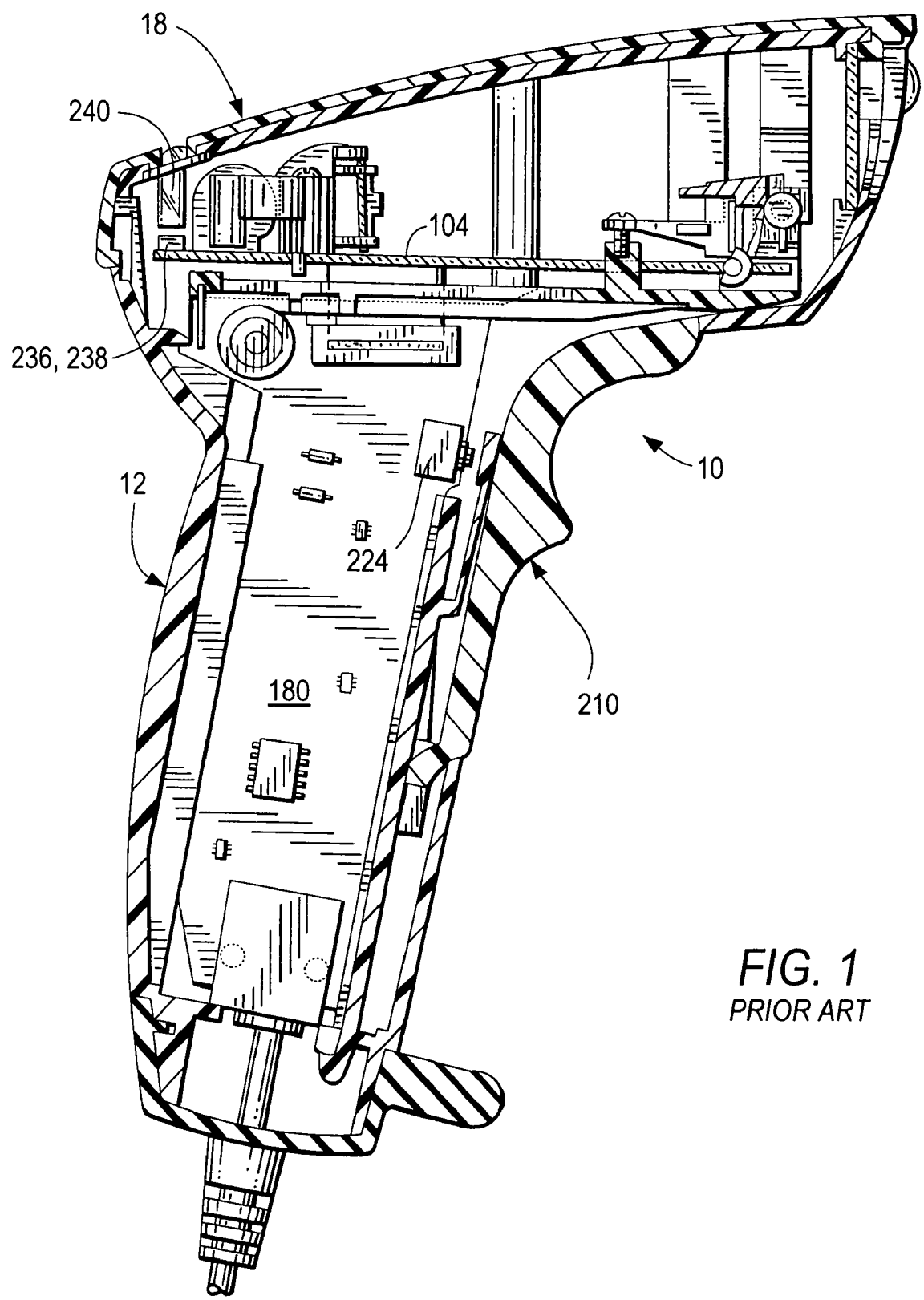
FIG. 1 is a sectional view of a hand-held electro-optical reader in accordance with the prior art.

Reference numeral 100 in FIG. 2 generally identifies an electro-optical reader, analogous to the prior art reader of FIG. 1, but deliberately configured to accommodate an integrated assembly of a trigger and a lightpipe, as detailed below. The reader 100 has a lower housing portion 102 and an upper housing portion 104 that meet along an interface or parting line 106. FIG. 3 depicts the same reader 100, but with the upper housing portion 104 removed to expose the interior of the reader.

Figure 6:
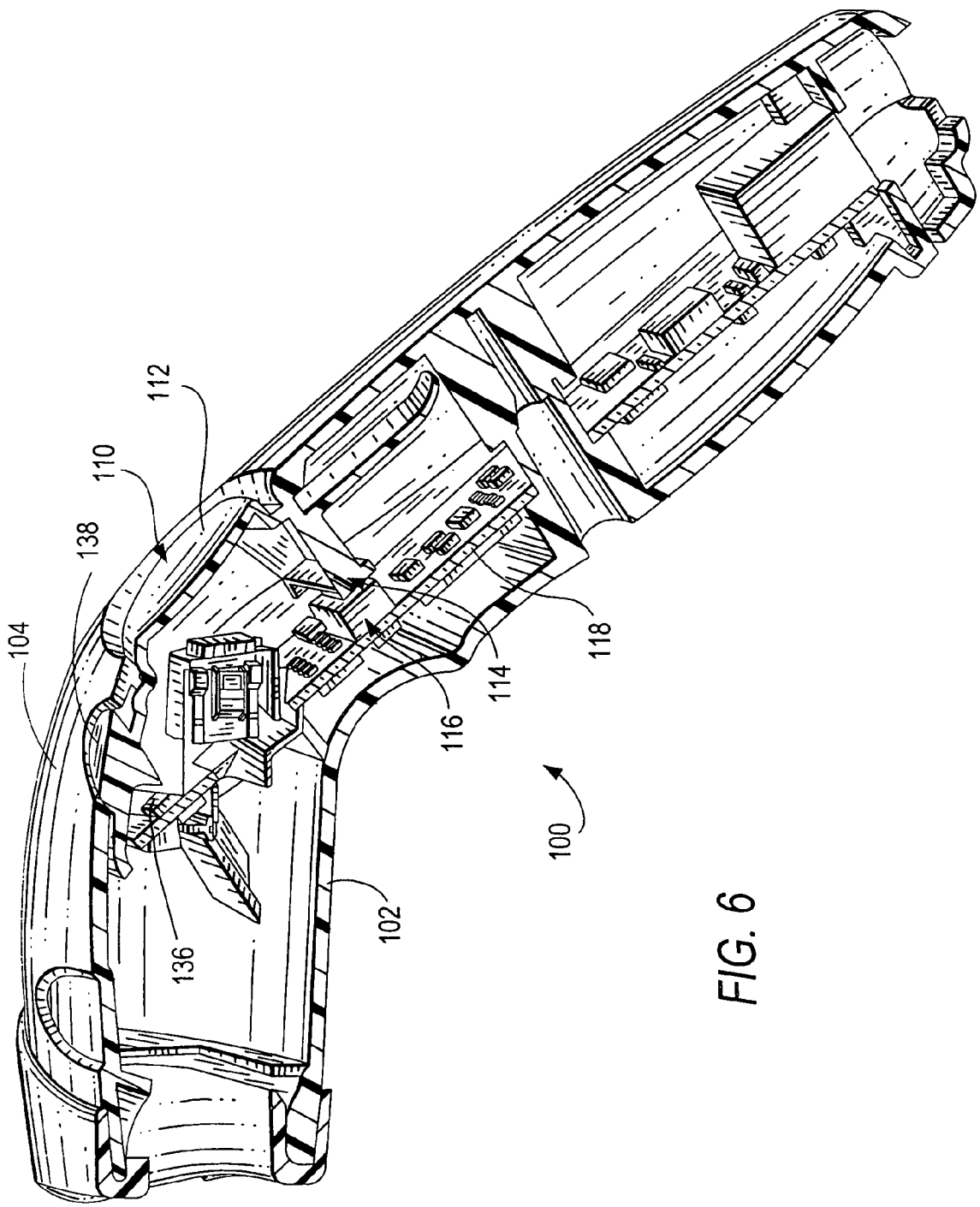
FIG. 6 is a sectional view taken on line 6-6 of FIG. 2.

In accordance with this invention, and as best shown in FIG. 4, a lightpipe 108 and a trigger 110 are integrated as a single component for assembly in the reader 100. The trigger 110 includes a movable press portion 112 engageable with, and depressable by, a finger of an operator. The trigger 100 also includes a switch actuating portion 114 engageable with a trigger switch 116 (FIG. 6) mounted on a printed circuit board 118 within the reader. The trigger 110 also includes a pair of pivot arms 120, 122 having a pair of collinear stub shafts 124, 126 defining a pivot axis. The trigger 110 also includes a resilient, bifurcated portion having offset spring arms 128, 130 that resiliently bear against the upper housing portion 104.

The trigger 110 also includes a pair of support arms 132, 134 on which the lightpipe 108 is fixedly integrated. The lightpipe 108 includes an elongated portion for conducting light emitted by a light source, such as a light emitting diode 136 (see FIG. 6) mounted on the board 118 within the housing to an exposed end portion 138. Returning to FIG. 2, it will be seen that the press portion 112 of the trigger and the exposed end portion 138 of the lightpipe are in close proximity to one another at the upper housing portion 104 of the reader.

In operation, the operator depresses the press portion 112 and concomitantly the switch actuating portion 114 turns about the pivot axis and depresses an armature of the trigger switch 116, thereby initiating reading. The spring arms 128, 130 are stressed during this depression. When the press portion 112 is released, the spring arms return the trigger to its initial unstressed position. If the reading is successful, a green light is emitted by the diode 138, and the green light is conducted along the lightpipe to the exposed end portion 138 to alert the operator that the indicia has been successfully read. If the reading was unsuccessful, then a red light emitted by the same diode 138, or by an adjacent diode, is conducted to the exposed end portion 138.

The lightpipe 108 could be adhered or heat fused to the trigger, but it is preferred to mold them together as a single component to reduce part and assembly cost. Preferably, the trigger and the lightpipe are made of synthetic plastic materials so that they can be injection molded together in a common mold. The trigger and the lightpipe could be made of the same material. For example, the lightpipe could be made of a light-transmissive material in order to display the red or green light as brightly as desired. In this case, if the trigger were made of the same light-transmissive material, then some of the red or green light would also be conducted to the trigger. If this is considered objectionable, then the trigger could be frosted or its exterior surface roughened to resist such light transmission.

It is preferred that the lightpipe and the trigger be made of different plastic materials to optimize their individual functions. The trigger is anticipated to be depressed multitudes of times and, hence, its fatigue life, as well as its resilience, are important. What is important for the light pipe is its optical characteristic, that is its transparency, translucence, or ability to efficiently conduct light.

To meet these concerns which, under certain circumstances, may be conflicting, the trigger or the lightpipe is injection molded of a first material in a first shot of a two-shot injection molding machine, and the lightpipe or the trigger is injection molded of a second different material in a second shot of the machine. This type of co-molding or overmolding is simpler and less expensive than the above-described overmolding of the lightpipe with the upper housing portion. Also, the visual appearance of any blemishes on the assembly is not a factor because the molding interface between the lightpipe and the trigger is concealed within the reader and, hence, is not subject to rejection by the customer.

It will be understood that each of the elements described above, or two or more together, also may find a useful application in other types of constructions differing from the types described above.

While the invention has been illustrated and described as embodied in an integrated assembly of a trigger and a lightpipe in electro-optical readers, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. An integrated assembly in a housing of a reader for electro-optically reading indicia, comprising:
    a) an actuatable trigger for initiating the reading of the indicia when actuated;
    b) a lightpipe for visibly displaying light indicative of a status of the reading initiated by actuation of the trigger; and
    c) the trigger and the lightpipe being integrated as a single component separate from the housing for assembly in the housing.

2. The assembly of claim 1, wherein the trigger and the lightpipe are constituted of synthetic plastic materials.

3. The assembly of claim 2, wherein the trigger and the lightpipe are molded of synthetic plastic materials.

4. The assembly of claim 2, wherein the synthetic plastic materials of the trigger and the lightpipe are different.

5. The assembly of claim 1, wherein the trigger includes a movable press portion for engagement with a finger of an operator, a switch actuating portion for engagement with a trigger switch, a pivot portion for guiding motion of the press and actuating portions in a direction for engaging the trigger switch, and a resilient portion for guiding motion of the press and actuating portions in an opposite return direction away from the trigger switch.

6. The assembly of claim 5, wherein the resilient portion is bifurcated.

7. The assembly of claim 5, wherein the pivot portion includes a pair of collinear stub shafts journalled for pivoting movement in the reader.

8. The assembly of claim 5, wherein the trigger further includes a pair of support arms with which the lightpipe is fixedly integrated.

9. The assembly of claim 1, wherein the lightpipe conducts the light from a light source within the housing to an exposed end exteriorly of the housing, the exposed end being operative for visibly displaying the light to an operator.

10. The assembly of claim 9, wherein the lightpipe is constituted of a light-transmissive synthetic plastic material, and wherein the trigger is constituted of a light-blocking synthetic plastic material.

11. The assembly of claim 9, wherein the trigger includes a movable press portion exteriorly of the housing, and wherein the exposed end of the lightpipe is mounted adjacent to the movable press portion.

12. In a reader for electro-optically reading indicia by initiating the reading upon actuation of a trigger supported by a housing, and by visibly displaying light indicative of a status of the reading with a lightpipe, an assembly method comprising the step of: integrating the trigger and the lightpipe as a single component separate from the housing for assembly in the housing.

13. The method of claim 12, wherein the integrating step is performed by injection molding the trigger and the lightpipe together of synthetic plastic materials.

14. The method of claim 13, wherein the integrating step is performed by using different synthetic plastic materials for the trigger and the lightpipe.

15. The method of claim 14, wherein the material used for the lightpipe is light-transmissive, and wherein the material used for the trigger is light-blocking.

16. The method of claim 13, wherein the integrating step is performed by positioning a movable press portion of the trigger adjacent to an exposed end of the lightpipe.

* * * * *